US011507294B2

(12) United States Patent
Alkalay et al.

(10) Patent No.: US 11,507,294 B2
(45) Date of Patent: Nov. 22, 2022

(54) PARTITIONING A CACHE FOR FULFILLING STORAGE COMMANDS

(71) Applicant: EMC IP Holding Company LLC, Hopkinton, MA (US)

(72) Inventors: Amitai Alkalay, Kadima (IL); Boris Glimcher, Bnei Brak (IL)

(73) Assignee: EMC IP Holding Company LLC, Hopkinton, MA (US)

(*) Notice: Subject to any disclaimer, the term of this patent is extended or adjusted under 35 U.S.C. 154(b) by 42 days.

(21) Appl. No.: 17/077,149

(22) Filed: Oct. 22, 2020

(65) Prior Publication Data
US 2022/0129178 A1   Apr. 28, 2022

(51) Int. Cl.
G06F 12/00 (2006.01)
G06F 13/00 (2006.01)
G06F 3/06 (2006.01)

(52) U.S. Cl.
CPC .......... G06F 3/0644 (2013.01); G06F 3/0604 (2013.01); G06F 3/0631 (2013.01); G06F 3/0647 (2013.01); G06F 3/0653 (2013.01); G06F 3/0683 (2013.01)

(58) Field of Classification Search
CPC .... G06F 3/0644; G06F 3/0604; G06F 3/0631; G06F 3/0647; G06F 3/0653; G06F 3/0683
USPC ........................................................ 711/154
See application file for complete search history.

(56) References Cited

U.S. PATENT DOCUMENTS

| 5,530,673 | A | * | 6/1996 | Tobita | G06F 3/0644 365/185.09 |
| 5,727,232 | A | * | 3/1998 | Iida | G06F 3/061 710/56 |
| 5,991,775 | A | * | 11/1999 | Beardsley | G06F 12/0866 707/999.205 |
| 6,078,520 | A | * | 6/2000 | Tobita | G06F 11/1433 365/185.09 |
| 6,105,103 | A | * | 8/2000 | Courtright, II | G06F 3/0608 707/999.202 |
| 6,553,476 | B1 | * | 4/2003 | Ayaki | H04N 5/781 711/204 |
| 10,635,348 | B2 | | 4/2020 | Yang et al. | |
| 10,812,584 | B2 | | 10/2020 | Yang et al. | |
| 11,126,573 | B1 | * | 9/2021 | Rohleder | G06F 12/0895 |

(Continued)

Primary Examiner — Sheng Jen Tsai
(74) Attorney, Agent, or Firm — BainwoodHuang

(57) ABSTRACT

A method of managing a storage appliance is provided. The method includes (a) partitioning a cache of the storage appliance at least into multiple regions dedicated to respective storage drives of a plurality of storage drives of the storage appliance; (b) in response to the storage appliance receiving a first storage command directed to a first storage drive, allocating space for fulfillment of the first storage command within the region of cache dedicated to the first storage drive; (c) in response to the storage appliance receiving a second storage command directed to a second storage drive, allocating space for fulfillment of the second storage command within the region of cache dedicated to the second storage drive; and (d) fulfilling, by the storage appliance, the first and second storage commands by moving data to and from their respective allocated space in the cache. An apparatus, system, and computer program product for performing a similar method are also provided.

13 Claims, 4 Drawing Sheets

(56) References Cited

U.S. PATENT DOCUMENTS

| | | | |
|---|---|---|---|
| 2004/0205296 A1* | 10/2004 | Bearden | G06F 12/0866 |
| | | | 711/129 |
| 2004/0205297 A1* | 10/2004 | Bearden | G06F 12/0804 |
| | | | 711/133 |
| 2006/0253681 A1* | 11/2006 | Zohar | G06F 12/00 |
| | | | 711/172 |
| 2008/0091840 A1* | 4/2008 | Guo | H04L 67/28 |
| | | | 709/231 |
| 2008/0285652 A1* | 11/2008 | Oxman | H04N 19/16 |
| | | | 375/240.16 |
| 2011/0153954 A1* | 6/2011 | Seki | G06F 3/0647 |
| | | | 711/141 |
| 2013/0262799 A1* | 10/2013 | Saito | G06F 3/064 |
| | | | 711/161 |
| 2014/0258591 A1* | 9/2014 | Dunn | G06F 12/0866 |
| | | | 711/103 |
| 2017/0139792 A1* | 5/2017 | Gupta | G06F 11/2089 |
| 2017/0177222 A1* | 6/2017 | Singh | G06F 9/45558 |
| 2020/0151104 A1* | 5/2020 | Yang | G06F 12/0804 |

* cited by examiner

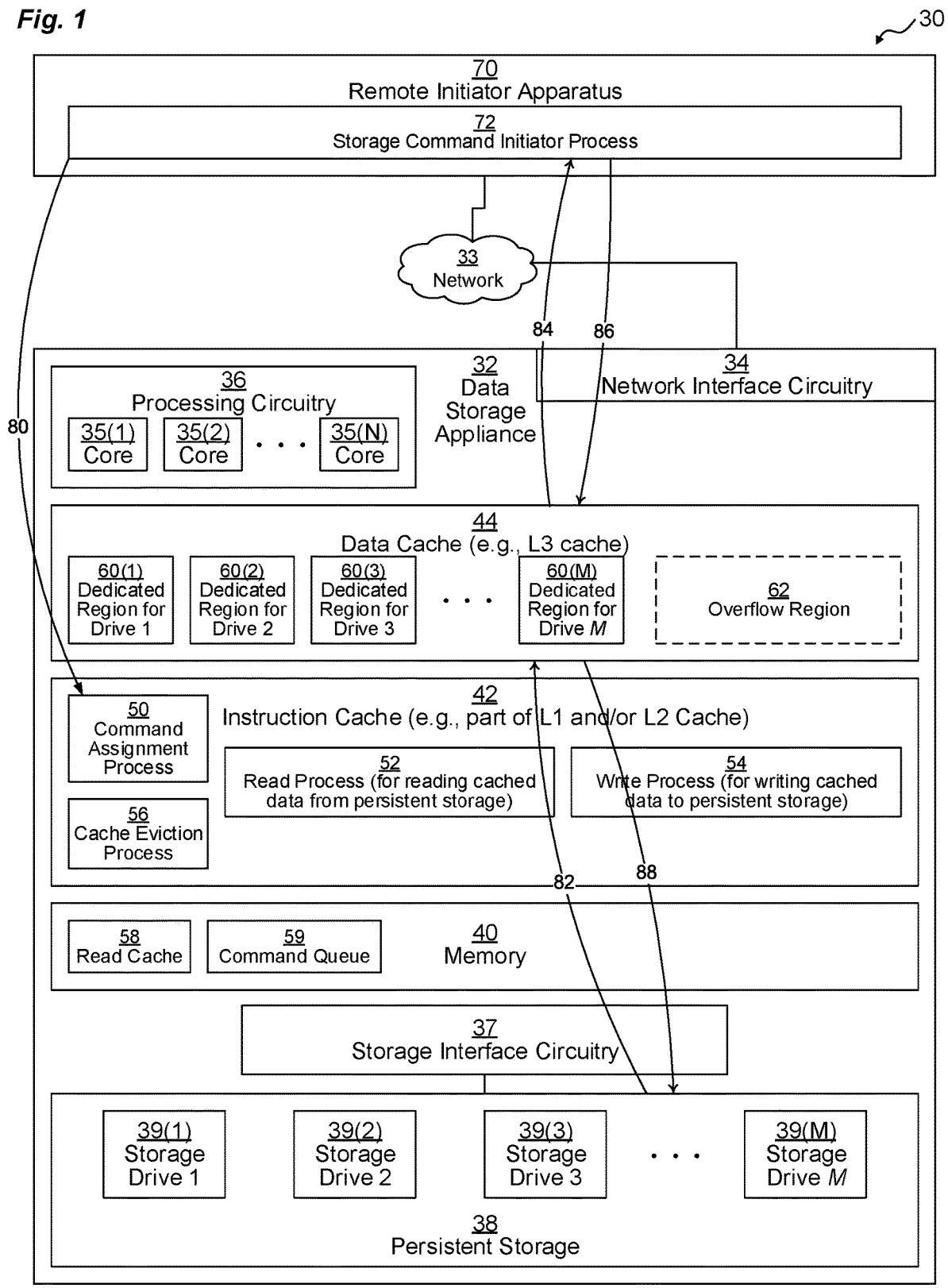

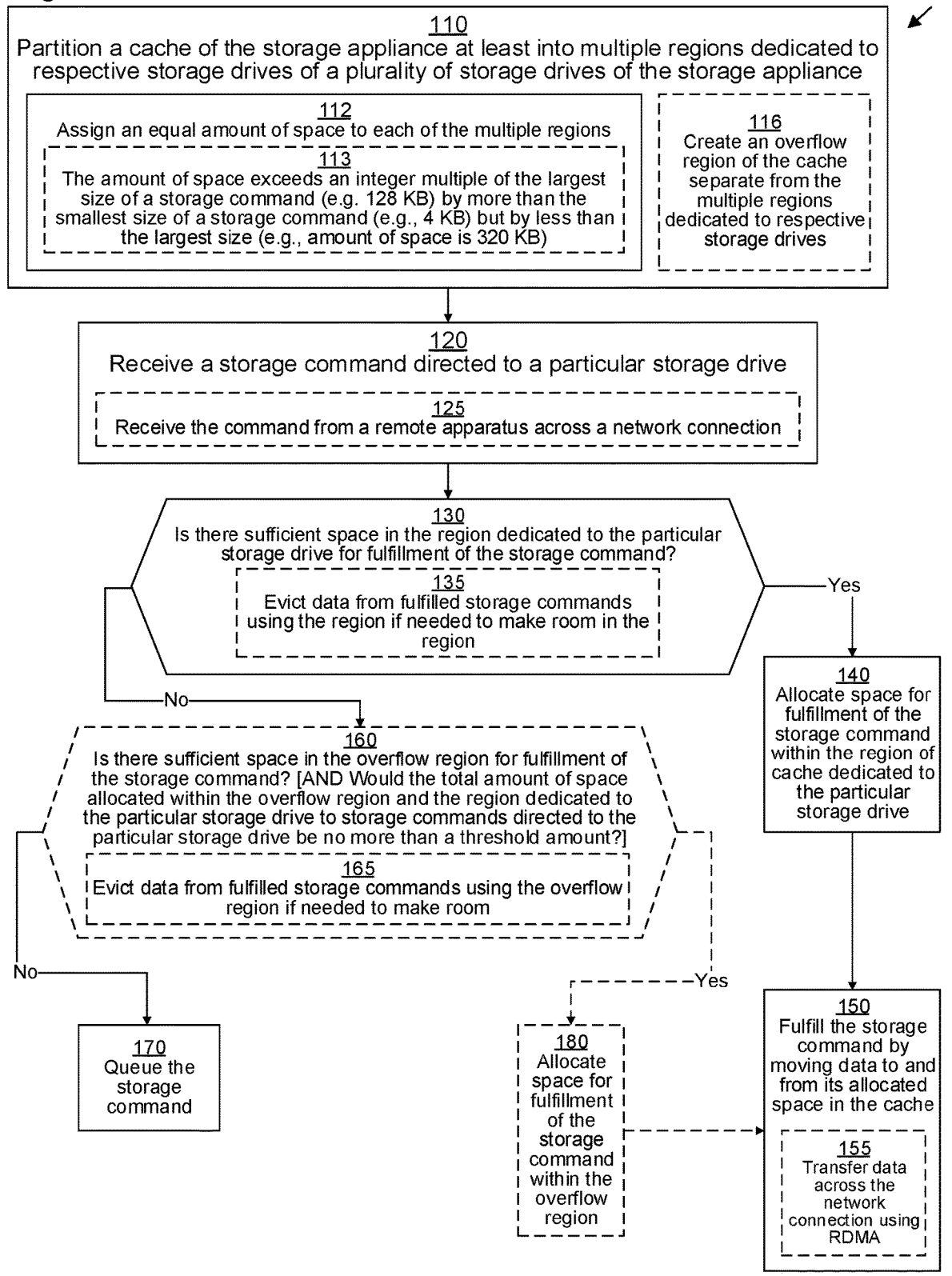

PARTITIONING A CACHE FOR FULFILLING STORAGE COMMANDS

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems provide block-based storage processing, meaning that they provide access to data at particular block addresses of logical disks. Other storage systems provide file-based storage, exposing only filesystems to users. Yet other storage systems provide both block-based and file-based storage to users.

SUMMARY

Some storage systems may include a main unit that includes powerful processing circuitry attached to storage drives as well as one or more remote units that primarily include additional storage drives for additional storage capacity. These remote units connect to the main unit over high speed network connections using Remote Direct Memory Access (RDMA) technology so that the powerful processing circuitry of the main unit is able to directly read data from and write data to memory or cache of the remote units. These remote units may have limited processing circuitry primarily configured to fulfill storage commands from the main unit by transferring data between the memory or cache and the additional storage drives. In some systems, the cache and processing circuitry of the remote units may be combined into a System on a Chip (SoC).

Although the cache of the SoC may be quite fast, it is typically limited in size in comparison to the slower memory of a remote unit. Thus, it would be ideal if all or most storage commands fulfilled by a remote unit could be processed using the cache without needing to access the slower memory. However, due to the fact that many storage commands may be sent to the remote unit in parallel, it is possible that the cache may not be large enough store as much cached data as necessary to simultaneously process all the storage commands, which means that cached data may be evicted from the cache into memory, slowing performance. In principle the remote unit could be configured to stop accepting storage commands once the cache is full (at least until storage commands could be fulfilled and then evicted from the cache), but that solution would not be effective if very many storage commands all directed to just one or even a small number of the additional drives were sent at once. Since each storage drive can only efficiently simultaneously process a limited number of storage commands (e.g., no more than 8 at a time), if the cache becomes filled entirely with storage commands directed at just one or a few drives, then the remote unit will not be able to make use of its full capabilities, and latency for commands aimed at other drives will increase.

Thus, it would be desirable to serve storage commands from a remote unit while both (I) preventing the cache of the remote unit from overflowing and (II) preventing the cache from filling up with storage commands directed at only a small subset of the additional drives of the remote unit. This may be accomplished by partitioning the cache of the remote unit into regions dedicated to respective ones of the additional drives and only allowing each region to store data of storage commands that are directed towards its respective additional drive. Thus, there is always space reserved for processing storage commands for each additional drive. Similar techniques may also be used for other storage system configurations.

In some embodiments, in order to avoid wasting cache space in case some of the additional drives are idle, the dedicated regions may be kept small (e.g., just large enough to process two or three storage commands), and any remaining space in the cache may be used as an overflow region for storage commands directed towards ones of the additional drives that are experiencing strong demand. In addition, in some embodiments, since storage commands may come in various sizes, in order to prevent several large commands from filling up the dedicated region for an additional drive while smaller commands are kept waiting, the dedicated regions can be sized such that at least one small storage command can fit together with one or more larger commands.

In one embodiment, a method of managing a storage appliance is provided. The method includes (a) partitioning a cache of the storage appliance at least into multiple regions dedicated to respective storage drives of a plurality of storage drives of the storage appliance; (b) in response to the storage appliance receiving a first storage command directed to a first storage drive, allocating space for fulfillment of the first storage command within the region of cache dedicated to the first storage drive; (c) in response to the storage appliance receiving a second storage command directed to a second storage drive, allocating space for fulfillment of the second storage command within the region of cache dedicated to the second storage drive; and (d) fulfilling, by the storage appliance, the first and second storage commands by moving data to and from their respective allocated space in the cache.

An apparatus, system, and computer program product for performing a similar method are also provided. For example, in one embodiment, a storage appliance apparatus is provided. The storage appliance apparatus includes (1) network interface circuitry connected to a network; (2) a cache; (3) a plurality of storage drives; and (4) processing circuitry coupled to memory. The processing circuitry coupled to memory is configured to (A) partition the cache at least into multiple regions dedicated to respective storage drives of the plurality of storage drives; (B) in response to receiving storage commands each directed to a particular storage drive, determine whether there is sufficient space within the region of cache dedicated to the particular storage drive for each received storage command; (C) in response to determining that there is sufficient space within the region of cache dedicated to a storage drive, allocate space for fulfillment of a storage command directed to that storage drive within the region of cache dedicated to that storage drive; and (D) fulfill the received storage commands by moving data to and from their respective allocated space in the cache.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 1 is a block diagram depicting an example system, apparatus, and data structure arrangement for use in connection with various embodiments.

FIG. 2 is a flowchart depicting an example procedure according to various embodiments.

DETAILED DESCRIPTION OF THE INVENTION

Figure 3A:
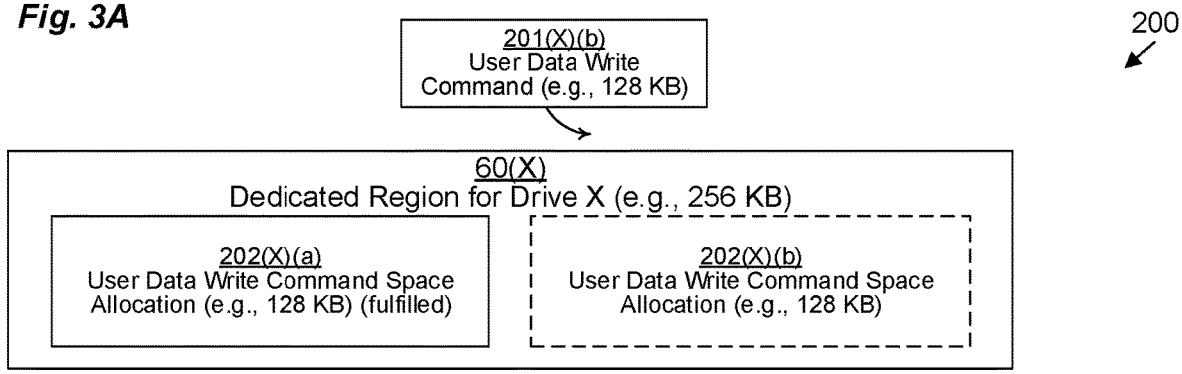
FIGS. 3A-3C are block diagrams depicting example data structure arrangements for use in connection with various embodiments.

Embodiments are directed to techniques for serving storage commands from a remote unit while both (I) preventing the cache of the remote unit from overflowing and (II) preventing the cache from filling up with storage commands directed at only a small subset of the additional drives of the remote unit. This may be accomplished by partitioning the cache of the remote unit into regions dedicated to respective ones of the additional drives and only allowing each region to store data of storage commands that are directed towards its respective additional drive. Thus, there is always space reserved for processing storage commands for each additional drive. Similar techniques may also be used for other storage system configurations.

FIG. 1 depicts an example environment 30 for use in connection with various embodiments. Environment 30 includes a Data Storage Appliance (DSA) 32. DSA 32 may be any kind of computing device, such as, for example, a personal computer, workstation, server computer, enterprise server, data storage array device, laptop computer, tablet computer, smart phone, mobile computer, etc. In one example embodiment, DSA 32 is a 2U rack server.

DSA 32 includes network interface circuitry 34, processing circuitry 36, Storage interface circuitry 37, persistent storage 38, memory 40, instruction cache 42, and data cache 44. DSA 32 connects to a network 33 using network interface circuitry 34.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above. In one example embodiment, processing circuitry 36 is a multi-core SoC having N cores 35 (depicted as cores 35(1), 35(2), . . . , 35(N)) as well as level 1 (L1) cache, level 2 (L2) cache, and level 3 (L3) cache. In this embodiment, data cache 44 is comprises the L3 cache of the SoC, and instruction cache 42 comprises at least part of the L1 and L2 caches of the SoC.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of M non-transitory persistent storage drives 39 (depicted as storage drives 39(1), 29(2), 39(3), . . . , 39(M)), such as, for example, hard disk drives, solid-state storage devices (SSDs), flash drives, etc.

Network interface circuitry 34 may include one or more Ethernet cards, cellular modems, Fibre Channel (FC) adapters, wireless networking adapters (e.g., Wi-Fi), and/or other devices for connecting to a network 33, such as, for example, a LAN, WAN, SAN, the Internet, a wireless communication network, a virtual network, a fabric of interconnected switches, etc. Network interface circuitry 34 allows DSA 32 to communicate with a remote initiator device 70 over the network 33. In one example embodiment, network interface circuitry 34 includes two 100 gigabit per second (Gbps) Ethernet connections to the remote initiator apparatus 70. In some embodiments, network interface circuitry 34 supports the Remote Direct Memory Access (RDMA) over converged Ethernet (RoCE) standard. In some embodiments, network interface circuitry 34 supports the Nonvolatile Memory Express (NVMe) over Fabrics (NVMe-OF) communications protocol for receiving storage commands over RoCE.

Memory 40 may be any kind of digital system memory, such as, for example, random access memory (RAM). Memory 40 stores an operating system (OS) (not depicted) in operation (e.g., a Linux, UNIX, Windows, MacOS, or similar operating system). Memory 40 also stores other software modules (not depicted) which each execute on processing circuitry 36, as well as a read cache 58 and a command queue 59. Memory 40 is typically slower than the instruction cache 42 and data cache 44.

Instruction cache 42, which may be realized as all or part of the L1 and L2 caches of the processing circuitry, includes various processes that execute on the processing circuitry 36, including command assignment process 50, read process 52, write process 54, and cache eviction process 56. In some embodiments, multiple instances of one or more of these processes 50, 52, 54, 56 is stored in different locations within the L1 and L2 caches for execution on different cores 35. In some embodiments, processes 50, 52, 54, 56 are also stored within memory 40.

Memory 40 may also store various other data structures used by the OS, processes 50, 52, 54, 56. and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the DSA 32 is powered off. The OS, processes 50, 52, 54, 56, and various other applications and drivers are typically stored in this persistent storage portion of memory 40 or on persistent storage 38 so that they may be loaded into a system portion of memory 40 or caches 42, 44 upon a system restart or as needed. The OS, processes 50, 52, 54, 56, and various other applications and drivers, when stored in non-transitory form either in the volatile portion of memory 40, instruction cache 42, or on persistent storage 38 or in persistent portion of memory 40, each form a computer program product. The processing circuitry 36 running one or more applications thus forms a specialized circuit constructed and arranged to carry out the various processes described herein.

Data cache 44, which may be realized as the L3 cache of the processing circuitry, may be divided into M dedicated regions 60 (depicted as dedicated regions 60(1), 60(2), 60(3), . . . , 60(M)), each assigned to a corresponding one of the storage drives 39 of the persistent storage 38. In some embodiments, data cache 44 may also include an overflow region 62 for shared use by all of the storage drives 39 of the persistent storage 38. In one example embodiment, data cache 44 is configured to operate at a speed of 200 Gbps, which is faster than the speed of memory 40.

In operation, a storage command initiator process 72 running on remote initiator apparatus 70 sends a storage command 80, such as a read or write command, across network 33 to the DSA 32 for fulfillment (e.g., using NVMe-OF). Command assignment process 50 receives the command 80, and allocates space for it within a dedicated region 60 or overflow region 62. For example, if the storage command 80 is directed at a particular storage drive 39(X), then command assignment process 50 allocates space for it in dedicated region 60(X). In some embodiments, if there is not enough space in that region 60(X), then command assignment process 50 allocates space for the storage command 80 in overflow region 62. If there is not enough space in overflow region 62, then command assignment process 50 may refuse to accept the storage command 80, in which case, storage command initiator process 72 may re-issue it again at a later time, or command assignment process 50 may instead queue the storage command 80 in command queue 59.

If storage command 80 is a read command, then read process 52 reads (step 82) data from the particular storage drive 39(X) into the allocated space within dedicated region 60(X) or overflow region 62, and then storage command initiator process 72 reads (step 84) that data from the allocated space within dedicated region 60(X) or overflow region 62 using RDMA. Once steps 82 and 84 have completed, the storage command has been fulfilled, and cache eviction process 56 is able to de-allocate the space from within dedicated region 60(X) or overflow region 62 by evicting the data from the cache 44 (e.g., either by simply deleting the data or by moving it to the read cache 58 within memory 40).

If storage command 80 is a write command, then storage command initiator process 72 writes (step 86) data to the allocated space within dedicated region 60(X) or overflow region 62 using RDMA, and then write process 54 writes (step 88) the data from the allocated space within dedicated region 60(X) or overflow region 62 to the particular storage drive 39(X). Once steps 86 and 88 have completed, the storage command has been fulfilled, and cache eviction process 56 is able to de-allocate the space from within dedicated region 60(X) or overflow region 62 by evicting the data.

FIG. 2 illustrates an example method 100 performed by DSA 32 for managing storage operation of the DSA 32. It should be understood that any time a piece of software (e.g., OS, processes 50, 52, 54, 56, etc.) is described as performing a method, process, step, or function, what is meant is that a computing device (e.g., a DSA 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, DSA 32 partitions the data cache 44 of the DSA 32 at least into multiple regions 60 dedicated to respective storage drives 38 of the plurality of storage drives 38 of the DSA 30. In sub-step 112, DSA 32 assigns an equal amount of space to each region 60. Thus, for example, if the data cache 44 is 12 megabytes (MB) and there are 24 drives 38, then DSA 32 may assign 512 kilobytes (KB) to each region 60. In other example embodiments, the number of drives 38 may range between 10 and 32, the size of the data cache may range between 8 MB and 32 MB, and the amount of space assigned to each region may range from 256 KB to 1 MB. Typically, step 110 is performed once upon system initialization or setup.

In sub-step 113, the amount of space assigned to each region exceeds an integer multiple of the largest size of a storage command (e.g. 128 KB) by more than the smallest size of a storage command (e.g., 4 KB) but by less than the largest size (128 KB). Thus, for example, DSA 32 may assign 320 KB to each region 60, so that each region can hold two large (128 KB) storage commands 80 during fulfillment but still have room (i.e., 64 KB) for several smaller (e.g., 4-KB or 8-KB) storage commands 80 during fulfillment. In one example embodiment, writes of user data are 128 KB in size, while reads of user data may be as small as 8 KB, and both reads and writes of metadata may be as small as 4 KB in size.

In optional sub-step 116, DSA 32 creates an overflow region 62 of the data cache 44 separate from the multiple regions 60 dedicated to respective storage drives 38. Thus, for example, if the data cache 44 is 12 megabytes (MB) and there are 24 drives 38, then DSA 32 may assign 256 kilobytes (KB) to each region 60 and 6 MB to the overflow region 62. As another example, if the data cache 44 is 12 megabytes (MB) and there are 24 drives 38, then DSA 32 may assign 320 kilobytes (KB) to each region 60 and 4.5 MB to the overflow region 62 (sub-step 116 combined with sub-step 113). In other example embodiments, the number of drives 38 may range between 10 and 32, the amount of space assigned to each region may range from 272 KB to 380 KB, and the overflow region 62 has a size within a range of 3 MB to 6 MB or one quarter to one half the size of the data cache 44.

In step 120, command assignment process 50 receives a storage command 80 directed towards a particular storage drive 38(X). Storage command 80 has a particular size. For example, storage command 80 may be a write command with a size of 128 KB or a read command with a size of 8 KB (or a multiple of 8 KB up to 128 KB). In sub-step 125, the storage command 80 is received from a remote apparatus (e.g., remote initiator apparatus 70) across network 33.

In response to step 120, in step 130, command assignment process 50 determines whether or not there is sufficient space in the region 60(X) dedicated to the particular storage drive 38(X) for fulfillment of the storage command 80. Thus, for example, with reference to example arrangement 200 of FIG. 3A, if region 60(X) is 256 KB in size and it currently holds one 128-KB user data write command space allocation 202(X)(a), then there is sufficient space to accept an incoming 128-KB user data write command 201(X)(b).

Figure 3B:
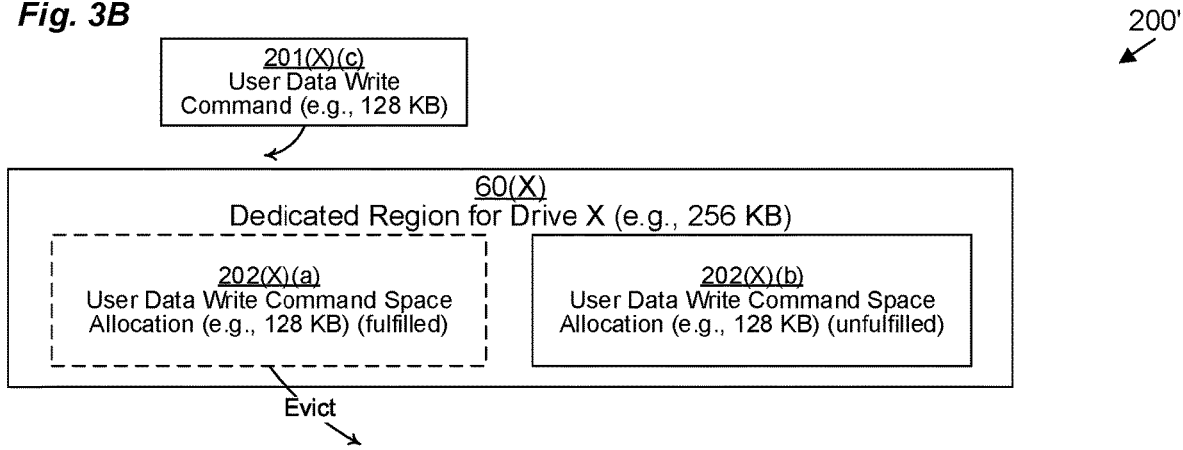

In some embodiments, as part of step 130, cache eviction process 56 may perform sub-step 135 to evict data from fulfilled storage commands using the region 60(X) if needed to make room in the region 60(X). Thus, for example, with reference to example arrangement 200' of FIG. 3B, if region 60(X) is 256 KB in size and it currently holds two 128-KB user data write command space allocation 202(X)(a), 202 (X)(b), then there is not yet sufficient space to accept an incoming 128-KB user data write command 201(X)(c), but since 128-KB user data write command space allocation 202(X)(a) represents a user data write command 201 that has already been fulfilled, cache eviction process 56 evicts 128-KB user data write command space allocation 202(X)(a), freeing up space to fulfill incoming 128-KB user data write command 201(X)(c).

If step 130 yields an affirmative result, then operation proceeds with step 140; otherwise, operation proceeds either with optional step 160 or with step 170.

In step 140, command assignment process 50 allocates space for fulfillment of the storage command 80 within the region 60(X) of cache 44 dedicated to the particular storage drive 38(X). Thus, for example, in the context of arrangements 200 and 200' (FIGS. 3A and 3B), command assignment process 50 allocates a 128 KB user data write command space allocation 202(X)(b) within region 60(X) for user data write command 201(X)(b).

After step 140, step 150 is performed. In some embodiments, all or part of step 150 may be performed in the background. In step 150, DSA 32 fulfills the storage command 80 by moving data to and from its allocated space 202 in the cache 44. Depending whether storage command 80 is a read or a write command, either read process 52 or write process 54 performs step 140. Thus, in the context of a read command, read process 52 reads the requested data from the drive 38(X) and stores it in the allocated space 202 in the cache 44 (step 82 from FIG. 1). Then, that data is transferred from the allocated space 202 in the cache 44 to the requestor (step 84 from FIG. 1). In the context of a write operation, the data to be written is transferred into the allocated space 202 in the cache 44 (step 86 from FIG. 1), and then write process 54 writes the stored data from the allocated space 202 in the cache 44 to drive 38(X) (step 88 from FIG. 1).

In some embodiments, step 150 includes sub-step 155. In sub-step 155, data is transferred across network 33 using RDMA. Thus, in the context of a read operation, once the data has been stored in the allocated space 202 in the cache 44, the storage command initiator process 72 running on the remote initiator apparatus 70 reads the contents of the allocated space 202 in the cache 44 across network 33 using RDMA (step 84 from FIG. 1). In the context of a write operation, the storage command initiator process 72 running on the remote initiator apparatus 70 writes the data of the write operation into the allocated space 202 in the cache 44 across network 33 using RDMA (step 86 from FIG. 1).

Step 160 is performed in response to a negative result from step 130 in some embodiments. In step 160, command assignment process 50 determines whether or not there is sufficient space in the overflow region 62 for fulfillment of the storage command 80. If not, then operation proceeds with step 170 in which the storage command 80 is either rejected or queued into the command queue 59 for later fulfillment. In some embodiments, command assignment process 50 also determines whether or not the total amount of space allocated within the overflow region 62 and the region 60(X) dedicated to the particular storage drive 38(X) to storage commands directed to the particular storage drive 38(X) would be no more than a threshold amount if the storage command 80 were to be assigned to the overflow region 62. If not (i.e., if the total amount would exceed the threshold), then operation proceeds with step 170 in which the storage command 80 is queued into the command queue 59. Otherwise, operation proceeds with step 180. In one example embodiment, the threshold amount is 1 MB. Thus, if the total amount of space within the region 60(X) and the overflow region 62 combined allocated to storage commands aimed at the particular drive 38(X) would exceed 1 MB, then operation proceeds with step 170 in which the storage command is queued into the command queue 59.

In some embodiments, as part of step 160, cache eviction process 56 may perform sub-step 165 to evict data from fulfilled storage commands using the overflow region 62 if needed to make room in the overflow region 62, similar to step 135 above, but in the context of the overflow region 62 rather than a dedicated region 60.

Figure 3C:
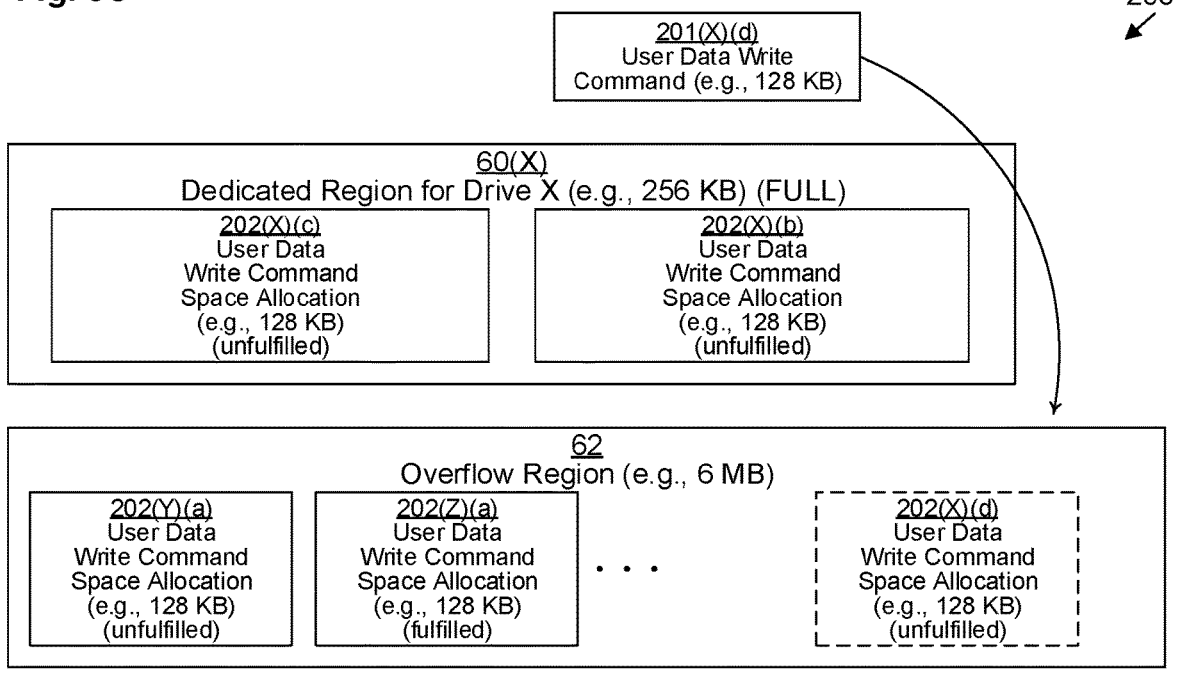

If step 160 yields an affirmative result, then operation proceeds with step 180. In step 180, command assignment process 50 allocates space for fulfillment of the storage command 80 within the overflow region 62 of cache 44. Thus, for example, in the context of arrangement 200" (FIG. 3C), once command assignment process 50 has determined that dedicated region 60(X) is full (negative result from step 130 since there are already two 128-KB user data write command space allocations 202(X)(b), 202(X)(c) within 256-KB region 60(X)), command assignment process 50 allocates a 128 KB user data write command space allocation 202(X)(d) within overflow region 62 for 128-KB user data write command 201(X)(d).

As another example, in the context of arrangement 300 (FIG. 4A), once command assignment process 50 has determined that there is insufficient space in dedicated region 60(X) to fulfill user data write command 301(X)(c) (negative result from step 130 since there are already two 128-KB user data write command space allocations 302(X)(a), 302(X)(b) within 320-KB region 60(X), leaving less than 128 KB free), command assignment process 50 allocates a 128 KB user data write command space allocation 302(X)(c) within overflow region 62 for 128-KB user data write command 301(X)(c).

After step 180, step 150 is performed, as described above, but this time step 150 is performed using the overflow region 62 rather than a dedicated region 60.

Steps 120-180 may be repeated for any additional storage commands 80 that come in, and multiple storage commands 80 may be processed in parallel.

Figure 4A:
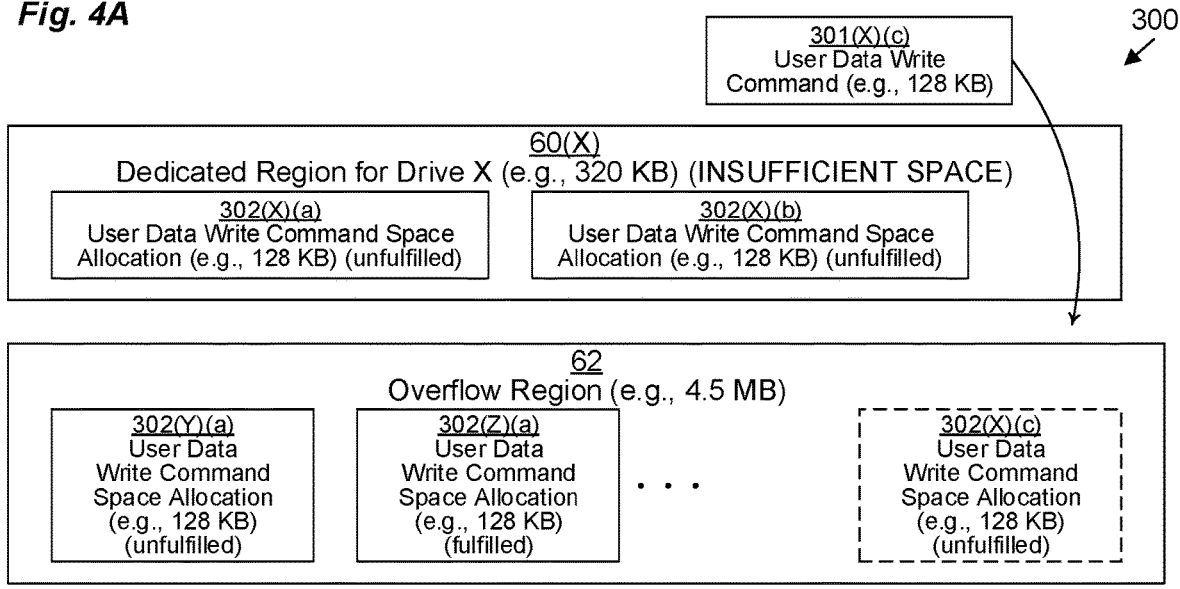
FIGS. 4A-4C are block diagrams depicting example data structure arrangements for use in connection with various embodiments.
Figure 4B:
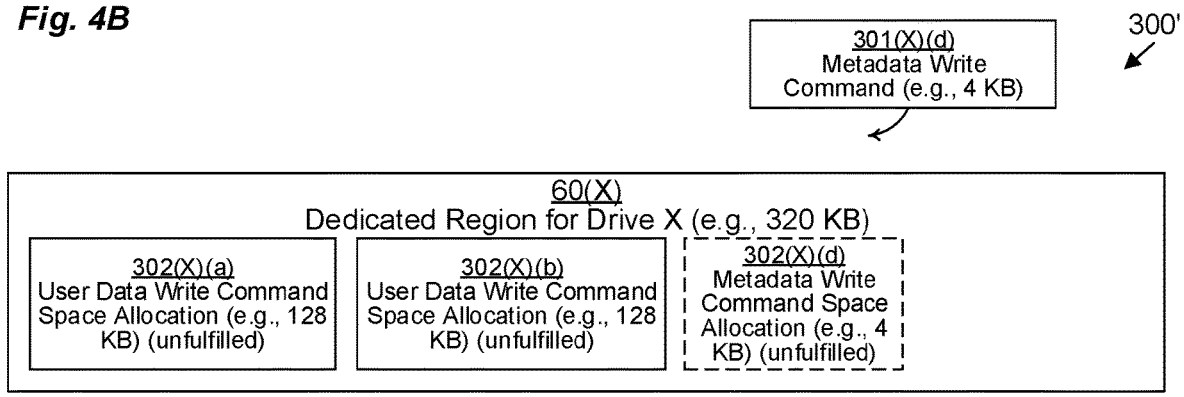

Looking now to arrangement 300' of FIG. 4B, which is shown after the events of arrangement 300 from FIG. 4A, command assignment process 50 receives a 4-KB metadata write command 301(X)(d) (step 120). In step 130, command assignment process 50 determines that there is sufficient space to fulfill 4-KB metadata write command 301(X)(d) using dedicated region 60(X) because even though there are already two 128-KB user data write command space allocations 302(X)(a), 302(X)(b) within 320-KB region 60(X) there is still 64 KB free, leaving enough space for a 4-KB metadata write command space allocation 302(X)(d) within dedicated region 60(X).

Figure 4C:
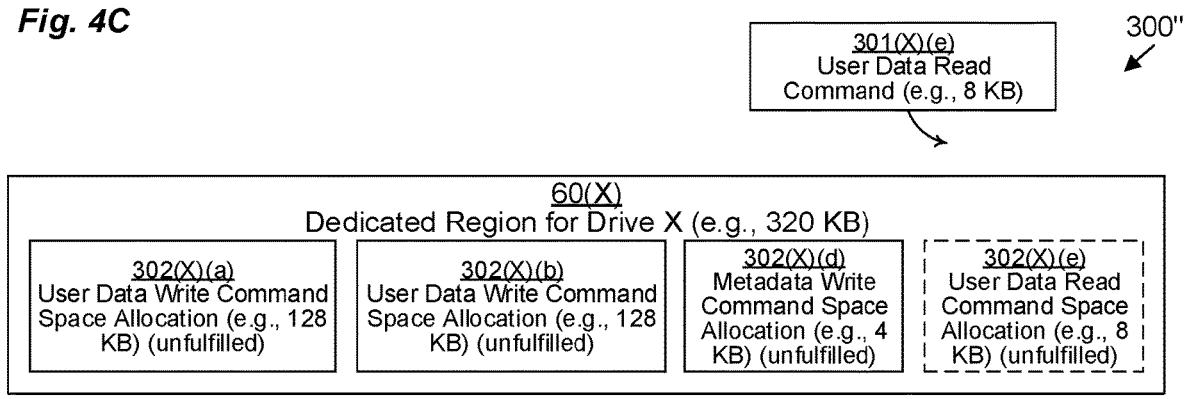

Similarly, looking to arrangement 300" of FIG. 4C, which is shown after the events of arrangement 300' from FIG. 4B, command assignment process 50 receives an 8-KB user data read command 301(X)(e) (step 120). In step 130, command assignment process 50 determines that there is sufficient space to fulfill 8-KB user data read command 301(X)(e) using dedicated region 60(X) because even though there are already two 128-KB user data write command space allocations 302(X)(a), 302(X)(b) and a 4-KB metadata write command space allocation 302(X)(d) within 320-KB region 60(X) there is still 60 KB free, leaving enough space for an 8-KB user data read command space allocation 302(X)(e) within dedicated region 60(X).

Thus, techniques have been presented techniques for serving storage commands 80 from a DSA 32 while both (a) preventing the cache 44 of the DSA 32 from overflowing and (b) preventing the cache 44 from filling up with storage commands 80 directed at only a small subset of the storage drives 38 of the DSA 32. This may be accomplished by partitioning the cache 44 of the DSA 32 into regions 60 dedicated to respective ones of the storage drives 38 and only allowing each region 60 to store data of storage commands 80 that are directed towards its respective storage drive 38. Thus, there is always room reserved for each storage drive 38 to process storage commands 80. In order to avoid wasting cache space in case some of the storage drives 38 are idle, the dedicated regions 60 may be kept small (e.g., just large enough to process two or three storage commands 80), and any remaining space in the cache 44 may be used as an overflow region 62 for storage commands 80 directed towards ones of the storage drives 38 that are experiencing strong demand. In addition, since storage commands 80 may come in various sizes, in order to prevent several large commands 80 from filling up the dedicated region 60 for a storage drive 38 while smaller commands 80 are kept waiting, the dedicated regions 60 can be sized such that at least one small storage command 80 can fit together with one or more larger commands 80.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of managing a storage appliance, the method comprising:
    partitioning a cache of the storage appliance at least into multiple regions dedicated to respective storage drives of a plurality of storage drives of the storage appliance, said partitioning including creating an overflow region of the cache separate from the multiple regions dedicated to respective storage drives;
    in response to the storage appliance receiving a first storage command directed to a first storage drive, allocating space for fulfillment of the first storage command within the region of cache dedicated to the first storage drive;
    in response to the storage appliance receiving a second storage command directed to a second storage drive, allocating space for fulfillment of the second storage command within the region of cache dedicated to the second storage drive;
    fulfilling, by the storage appliance, the first and second storage commands by moving data to and from their respective allocated space in the cache,
    in response to the storage appliance receiving a third storage command directed to the first storage drive while the first storage command has not yet been fulfilled, detecting that the region dedicated to the first storage drive does not have sufficient space for fulfillment of the third storage command;
    in response to detecting, allocating space for fulfillment of the third storage command within the overflow region of the cache; and
    fulfilling, by the storage appliance, the third storage command by moving data to or from its allocated space within the overflow region,
    wherein the storage appliance is configured to receive storage commands ranging from a smallest size to a largest size;
    wherein partitioning further includes assigning to each of the multiple regions an amount of space that exceeds an integer multiple of the largest size by more than the smallest size but less than the largest size;
    wherein the first and third storage commands each have a size equal to the largest size; and
    wherein the method further comprises:
        in response to the storage appliance receiving a fourth storage command having a size smaller than the largest size directed to the first storage drive while the first and third storage commands have not yet been fulfilled, detecting that the region dedicated to the first storage drive does have sufficient space for fulfillment of the fourth storage command;
        in response to detecting that the region dedicated to the first storage drive does have sufficient space for fulfillment of the fourth storage command, allocating space for fulfillment of the fourth storage command within the region of cache dedicated to the first storage drive; and fulfilling, by the storage appliance, the fourth storage command by moving data to or from its allocated space within the region of cache dedicated to the first storage drive.

2. The method of claim 1, wherein the smallest size is within a range of 4 kilobytes (KB) to 16 KB;

wherein the largest size is 128 KB;

wherein the amount of space assigned to each of the multiple regions is within a range of 272 KB to 380 KB;

wherein the cache has a total size of 12 megabytes (MB);

wherein the plurality of storage drives of the storage appliance includes between 10 and 32 storage drives; and wherein the overflow region has a size within a range of 3 MB to 6 MB.

3. The method of claim 1, wherein the method further comprises:

in response to the storage appliance receiving a fourth storage command directed to the first storage drive while the first and third storage commands have not yet been fulfilled, detecting that both:

(a) the region dedicated to the first storage drive does not have sufficient space for fulfillment of the third storage command and (b) a total amount of space allocated within the overflow region and the region dedicated to the first storage drive to storage commands directed to the first storage drive exceeds a threshold amount; and in response to detecting both (a) and (b), queueing the fourth storage command by the storage appliance for later fulfillment.

4. The method of claim 1, wherein the method further comprises:

in response to the storage appliance receiving a fourth storage command directed to the first storage drive while the first and third storage commands have not yet been fulfilled, detecting that both:

(a) the region dedicated to the first storage drive does not have sufficient space for fulfillment of the third storage command and (b) the overflow region does not have sufficient space for fulfillment of the third storage command; and in response to detecting both (a) and (b), queueing the fourth storage command by the storage appliance for later fulfillment.

5. The method of claim 1, wherein the amount of space assigned to each of the multiple regions is within a range of 256 kilobytes (KB) to 1 megabyte (MB);

wherein the cache has a total size within a range of 8 MB to 32 MB;

wherein the plurality of storage drives of the storage appliance includes between 10 and 32 storage drives; and wherein the overflow region has a size within a range of one quarter to one half the total size of the cache.

6. The method of claim 1, wherein the method further comprises:

in response to the storage appliance receiving a third storage command directed to the first storage drive while the first storage command has not yet been fulfilled, detecting that the region dedicated to the first storage drive does not have sufficient space for fulfillment of the third storage command; and in response to detecting, queueing the third storage command by the storage appliance for later fulfillment.

7. The method of claim 6, wherein the storage appliance is configured to receive storage commands ranging from a smallest size to a largest size;

wherein partitioning further includes assigning to each of the multiple regions an amount of space that exceeds an integer multiple of the largest size by more than the smallest size but less than the largest size;

wherein the first and third storage commands each have a size equal to the largest size; and wherein the method further comprises:

in response to the storage appliance receiving a fourth storage command having a size smaller than the largest size directed to the first storage drive of the plurality of storage drives while the first and third storage commands have not yet been fulfilled, detecting that the region dedicated to the first storage drive does have sufficient space for fulfillment of the fourth storage command;

in response to detecting that the region dedicated to the first storage drive does have sufficient space for fulfillment of the fourth storage command, allocating space for fulfillment of the fourth storage command within the region of cache dedicated to the first storage drive; and fulfilling, by the storage appliance, the fourth storage command by moving data to or from its allocated space within the region of cache dedicated to the first storage drive.

8. The method of claim 1, wherein the first and second storage commands are received from an apparatus remote from the storage appliance across a network connection; and wherein fulfilling the first and second storage commands by moving data to and from their allocated space includes transferring data across the network connection using Remote Direct Memory Access (RDMA).

9. A computer program product comprising a non-transitory computer-readable storage medium storing a set of instructions, which, when executed by processing circuitry of a storage appliance, cause the storage appliance to perform the following operations:

partitioning a cache of the storage appliance at least into multiple regions dedicated to respective storage drives of a plurality of storage drives of the storage appliance;

in response to receiving storage commands each directed to a particular storage drive, determining whether there is sufficient space within the region of cache dedicated to the particular storage drive for each received storage command;

in response to determining that there is sufficient space within the region of cache dedicated to a storage drive, allocating space for fulfillment of a storage command directed to that storage drive within the region of cache dedicated to that storage drive;

fulfilling the received storage commands by moving data to and from their respective allocated space in the cache;

in response to the storage appliance receiving a third storage command directed to the first storage drive while the first storage command has not yet been fulfilled, detecting that the region dedicated to the first storage drive does not have sufficient space for fulfillment of the third storage command; and in response to detecting, queueing the third storage command by the storage appliance for later fulfillment, wherein the storage appliance is configured to receive storage commands ranging from a smallest size to a largest size;

wherein partitioning further includes assigning to each of the multiple regions an amount of space that exceeds an integer multiple of the largest size by more than the smallest size but less than the largest size;

wherein the first and third storage commands each have a size equal to the largest size: and wherein the method further comprises:
- in response to the storage appliance receiving a fourth storage command having a size smaller than the largest size directed to the first storage drive of the plurality of storage drives while the first and third storage commands have not yet been fulfilled, detecting that the region dedicated to the first storage drive does have sufficient space for fulfillment of the fourth storage command;
- in response to detecting that the region dedicated to the first storage drive does have sufficient space for fulfillment of the fourth storage command, allocating space for fulfillment of the fourth storage command within the region of cache dedicated to the first storage drive; and
- fulfilling, by the storage appliance, the fourth storage command by moving data to or from its allocated space within the region of cache dedicated to the first storage drive.

10. A storage appliance apparatus comprising:

network interface circuitry connected to a network;

a cache;

a plurality of storage drives; and processing circuitry coupled to memory configured to:
- partition the cache at least into multiple regions dedicated to respective storage drives of the plurality of storage drives, including creation of an overflow region of the cache separate from the multiple regions dedicated to respective storage drives;
- in response to receiving storage commands each directed to a particular storage drive, determine whether there is sufficient space within the region of cache dedicated to the particular storage drive for each received storage command;
- in response to determining that there is sufficient space within the region of cache dedicated to a storage drive, allocate space for fulfillment of a storage command directed to that storage drive within the region of cache dedicated to that storage drive;
- fulfill the received storage commands by moving data to and from their respective allocated space in the cache,
- in response to receipt of a first storage command directed to a first storage drive, allocate space for fulfillment of the first storage command within the region of cache dedicated to the first storage drive;
- in response to receipt of a second storage command directed to a second storage drive, allocate space for fulfillment of the second storage command within the region of cache dedicated to the second storage drive;
- fulfill the first and second storage commands by moving data to and from their respective allocated space in the cache,
- in response to receipt of a third storage command directed to the first storage drive while the first storage command has not yet been fulfilled, detect that the region dedicated to the first storage drive does not have sufficient space for fulfillment of the third storage command;
- in response to detection, allocate space for fulfillment of the third storage command within the overflow region of the cache; and
- fulfill the third storage command by moving data to or from its allocated space within the overflow region, wherein the storage appliance is configured to receive storage commands ranging from a smallest size to a largest size;

wherein the processing circuitry configured to partition is further configured to assign to each of the multiple regions an amount of space that exceeds an integer multiple of the largest size by more than the smallest size but less than the largest size;

wherein the first and third storage commands each have a size equal to the largest size; and wherein the processing circuitry is further configured to:
- in response to receipt of a fourth storage command having a size smaller than the largest size directed to the first storage drive while the first and third storage commands have not yet been fulfilled, detect that the region dedicated to the first storage drive does have sufficient space for fulfillment of the fourth storage command;
- in response to a detection that he region dedicated to the first storage drive does have sufficient space for fulfillment of the fourth storage command, allocate space for fulfillment of the fourth storage command within the region of cache dedicated to the first storage drive; and
- fulfill the fourth storage command by moving data to or from its allocated space within the region of cache dedicated to the first storage drive.

11. The method of claim 10, wherein the processing circuitry is further configured to, in response to the storage appliance receiving an additional storage command having a size smaller than the largest size directed to the first storage drive while the first storage command has not yet been fulfilled, (i) detect that the region dedicated to the first storage drive does have sufficient space for fulfillment of the additional storage command and (ii) allocate space for fulfillment of the additional storage command within the region of cache dedicated to the first storage drive.

12. The method of claim 1, further comprising:
- in response to the storage appliance receiving an additional storage command having a size smaller than the largest size directed to the first storage drive while the first storage command has not yet been fulfilled, (i) detecting that the region dedicated to the first storage drive does have sufficient space for fulfillment of the additional storage command and (ii) allocating space for fulfillment of the additional storage command within the region of cache dedicated to the first storage drive.

13. The method of claim 1, wherein the first storage drive is a first individual solid state disk drive and the second storage drive is a second individual solid state disk drive.

* * * * *